United States Patent
Ueno et al.

(10) Patent No.: US 12,003,852 B2
(45) Date of Patent: Jun. 4, 2024

(54) IMAGE CAPTURE APPARATUS AND CONTROL METHOD

(71) Applicant: CANON KABUSHIKI KAISHA, Tokyo (JP)

(72) Inventors: Daiyu Ueno, Kanagawa (JP); Yoichiro Imai, Kanagawa (JP); Hiroshi Toriumi, Kanagawa (JP); Tomoyuki Shiozaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 17/864,516

(22) Filed: Jul. 14, 2022

(65) Prior Publication Data

US 2022/0353413 A1  Nov. 3, 2022

Related U.S. Application Data

(63) Continuation of application No. PCT/JP2021/001716, filed on Jan. 19, 2021.

(30) Foreign Application Priority Data

Jan. 24, 2020 (JP) .................................. 2020-010328

(51) Int. Cl.
  *H04N 23/667* (2023.01)
  *H04N 23/62* (2023.01)
  (Continued)

(52) U.S. Cl.
  CPC .......... *H04N 23/667* (2023.01); *H04N 23/62* (2023.01); *H04N 23/63* (2023.01); *H04N 23/651* (2023.01)

(58) Field of Classification Search
  CPC ...... H04N 23/667; H04N 23/62; H04N 23/63; H04N 23/651; H04N 23/60; H04N 23/65; G03B 15/00; G03B 17/00; G03B 17/20
  See application file for complete search history.

(56) References Cited

U.S. PATENT DOCUMENTS 8,441,571 B2   5/2013 Yamagishi
2004/0136596 A1* 7/2004 Oneda ............... H04N 19/184
                                                     375/E7.184

(Continued)

FOREIGN PATENT DOCUMENTS

JP     2006-333315 A    12/2006
JP     2007-081737 A     3/2007

(Continued)

OTHER PUBLICATIONS

International Search Report dated Mar. 23, 2021 of the corresponding International Application, PCT/JP2021/001716, a copy of which is enclosed.

(Continued)

*Primary Examiner* — Shahbaz Nazrul
(74) *Attorney, Agent, or Firm* — Cowan, Liebowitz & Latman, P.C.

(57) ABSTRACT

An image capture apparatus comprises a display unit that displays a captured image, an output unit that outputs the image to an external device, a processing unit capable of switching and executing a plurality of operations that include a first operation of capturing the image with an image capturing mode setting during shooting standby, and a second operation of capturing the image with the same image capturing mode setting regardless of whether it is during shooting standby or during shooting, and a control unit that, when an output of the image to the external device is not being performed, permits the processing unit to perform the first operation, and when an output of the image to the external device is being performed, prohibits the processing unit to perform the first operation.

10 Claims, 8 Drawing Sheets

(51) Int. Cl.
*H04N 23/63* (2023.01)
*H04N 23/65* (2023.01)

(56) References Cited

U.S. PATENT DOCUMENTS

| | | | |
|---|---|---|---|
| 2007/0058074 A1 | 3/2007 | Yamagishi | |
| 2007/0122140 A1 | 5/2007 | Ito et al. | |
| 2007/0234084 A1* | 10/2007 | Furuta | G06F 1/329 |
| | | | 713/300 |
| 2010/0253803 A1* | 10/2010 | Ise | H04N 23/667 |
| | | | 348/222.1 |
| 2013/0135509 A1* | 5/2013 | Fuji | H04N 23/631 |
| | | | 348/333.02 |
| 2019/0149743 A1* | 5/2019 | Toyoda | H04N 23/667 |
| | | | 348/372 |
| 2020/0322543 A1* | 10/2020 | Onda | H04N 23/651 |
| 2023/0036096 A1* | 2/2023 | Tomizawa | H04N 23/633 |
| 2023/0037190 A1* | 2/2023 | Ise | H04N 23/667 |

FOREIGN PATENT DOCUMENTS

| | | |
|---|---|---|
| JP | 2007-134805 A | 5/2007 |
| JP | 2010-245880 A | 10/2010 |
| JP | 2012-165373 A | 8/2012 |
| WO | 2019/207641 A1 | 10/2019 |

OTHER PUBLICATIONS

Nov. 16, 2022 Indian Office Action, a copy of which is enclosed with an English Translation, that issued in Indian Patent Application No. 202247040581.

* cited by examiner

| DURING SHOOTING STANDBY | | DURING SHOOTING | | |
|---|---|---|---|---|
| IMAGE QUALITY | FRAME RATE | SIGNAL READING METHOD | IMAGE QUALITY | FRAME RATE | SIGNAL READING METHOD |
| 4K | 30FPS | DOT-BY-DOT | 8K | 30FPS | OVERSAMPLING |
| 4K | 30FPS | DOT-BY-DOT | 4K | 30FPS | OVERSAMPLING |
| 4K | 30FPS | DOT-BY-DOT | 4K | 120FPS | DOT-BY-DOT |
| 4K | 30FPS | DOT-BY-DOT | 4K | 60FPS | DOT-BY-DOT |
| 4K | 30FPS | DOT-BY-DOT | 4K | 30FPS | OVERSAMPLING |
| FHD | 30FPS | DOT-BY-DOT | FHD | 60FPS | DOT-BY-DOT |

IMAGE CAPTURE APPARATUS AND CONTROL METHOD

CROSS-REFERENCE TO RELATED APPLICATIONS

This application is a Continuation of International Patent Application No. PCT/JP2021/001716, filed Jan. 19, 2021, which claims the benefit of Japanese Patent Application No. 2020-010328 filed Jan. 24, 2020, both of which are hereby incorporated by reference herein in their entirety.

BACKGROUND OF THE INVENTION

Field of the Invention

The present invention relates to techniques capable of changing an operation mode during shooting.

Background Art

When a moving image shooting is performed in an image capture apparatus such as a digital camera, if a processing load of an image capturing unit and a power consumption of a battery increase, these devices may generate heat, and it is likely to be higher temperature inside the apparatus. For this reason, there are image capture apparatuses such as the digital cameras that are equipped with a temperature rising reduction function that suppresses the processing load of the image capturing unit and the power consumption of the battery so as not to be higher temperature inside the apparatus.

The temperature rising reduction function (eco mode) is, by reducing a frame rate and resolution of an image during shooting standby to be lower than those during shooting, a function of suppressing the processing load of the image capturing unit and the power consumption of the battery (PTLs 1 and 2).

CITATION LIST

Patent Literature

[PTL1] Japanese Patent Laid-Open No. 2012-165373
[PTL2] Japanese Patent Laid-Open No. 2006-333315

However, when the image capture apparatus outputs an image to an external device, an image recording may be performed in an external recording device or details of an image quality may be checked in an external display device even during shooting standby, and if the image quality or the like may be deteriorated in such cases, it is likely to record an image that is not desired by a user or not be able to check details of the image quality by the user.

SUMMARY OF THE INVENTION

The present invention has been made in consideration of the aforementioned problems, and realizes techniques of reducing a temperature rising inside the apparatus and suppressing deterioration of a quality of an image to be output to an external device.

In order to solve the aforementioned problems, the present invention provides an image capture apparatus comprising: a display unit configured to display an image obtained by an image capturing unit; an output unit configured to output the image to an external device; a processing unit capable of switching and executing a plurality of operations that include a first operation of capturing the image with an image capturing mode setting during shooting standby that is different from an image capturing mode setting during shooting, and a second operation of capturing the image with the same image capturing mode setting regardless of whether it is during shooting standby or during shooting; and a control unit configured to, when an output of the image to the external device is not being performed by the output unit, permit the processing unit to perform the first operation, and when an output of the image to the external device is being performed by the output unit, prohibit the processing unit to perform the first operation.

In order to solve the aforementioned problems, the present invention provides an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image in which a frame rate during shooting standby is lower than a frame rate during shooting, when an output of the image to the external device is being performed by the output unit, cause the image capturing unit to execute a second operation for obtaining the image of which a frame rate is equal regardless of whether it is during shooting standby or during shooting.

In order to solve the aforementioned problems, the present invention provides an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image in which an image quality during shooting standby is lower than an image quality during shooting, when an output of the image to the external device is being performed by the output unit, cause the image capturing unit to execute a second operation for obtaining the image of which an image quality is equal regardless of whether it is during shooting standby or during shooting.

In order to solve the aforementioned problems, the present invention provides an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image by a reading method during shooting standby which is different from a reading method during shooting, when an output of the image to the external device is not being performed by the output unit, cause the image capturing unit to execute a second operation for obtaining the image by the same reading method regardless of whether it is during shooting standby or during shooting.

In order to solve the aforementioned problems, the present invention provides a method of controlling an image capture apparatus which has a display unit configured to display an image obtained by an image capturing unit and an output unit configured to output the image to an external device, and is capable of switching and executing a plurality of operations that include a first operation of capturing the image with an image capturing mode setting during shooting standby that is different from an image capturing mode setting during shooting, and a second operation of capturing the image with the same image capturing mode setting regardless of whether it is during shooting standby or during shooting, the method comprising: when an output of the image to the external device is not being performed by the output unit, permitting the image capture apparatus to execute the first operation; and when an output of the image to the external device is being performed by the output unit, prohibiting the image capture apparatus to execute the first operation.

In order to solve the aforementioned problems, the present invention provides a non-transitory computer-readable storage medium storing a program for causing a computer to function as an image capture apparatus comprising: a display unit configured to display an image obtained by an image capturing unit; an output unit configured to output the image to an external device; a processing unit capable of switching and executing a plurality of operations that include a first operation of capturing the image with an image capturing mode setting during shooting standby that is different from an image capturing mode setting during shooting, and a second operation of capturing the image with the same image capturing mode setting regardless of whether it is during shooting standby or during shooting; and a control unit configured to, when an output of the image to the external device is not being performed by the output unit, permit the processing unit to perform the first operation, and when an output of the image to the external device is being performed by the output unit, prohibit the processing unit to perform the first operation.

In order to solve the aforementioned problems, the present invention provides a non-transitory computer-readable storage medium storing a program for causing a computer to function as an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image in which a frame rate during shooting standby is lower than a frame rate during shooting, when an output of the image to the external device is being performed by the output unit, cause the image capturing unit to execute a second operation for obtaining the image of which a frame rate is equal regardless of whether it is during shooting standby or during shooting.

In order to solve the aforementioned problems, the present invention provides a non-transitory computer-readable storage medium storing a program for causing a computer to function as an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image in which an image quality during shooting standby is lower than an image quality during shooting, when an output of the image to the external device is being performed by the output unit, cause the image capturing unit to execute a second operation for obtaining the image of which an image quality is equal regardless of whether it is during shooting standby or during shooting.

In order to solve the aforementioned problems, the present invention provides a non-transitory computer-readable storage medium storing a program for causing a computer to function as an image capture apparatus comprising: an image capturing unit; a display unit configured to display an image obtained by the image capturing unit; an output unit configured to output the image to an external device; and a control unit configured to, when an output of the image to the external device is not being performed by the output unit, cause the image capturing unit to execute a first operation for obtaining the image by a reading method during shooting standby which is different from a reading method during shooting, when an output of the image to the external device is not being performed by the output unit, cause the image capturing unit to execute a second operation for obtaining the image by the same reading method regardless of whether it is during shooting standby or during shooting.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Embodiments upon application of the present invention to an image capture apparatus such as a digital single-lens reflex camera capable of shooting a still image or moving image will be described in detail hereinafter with reference to the drawings.

<Apparatus Configuration>

The configuration and functions of the digital camera according to the present embodiment will be described below with reference to FIGS. 1A, 1B and 2.

Figure 1A:
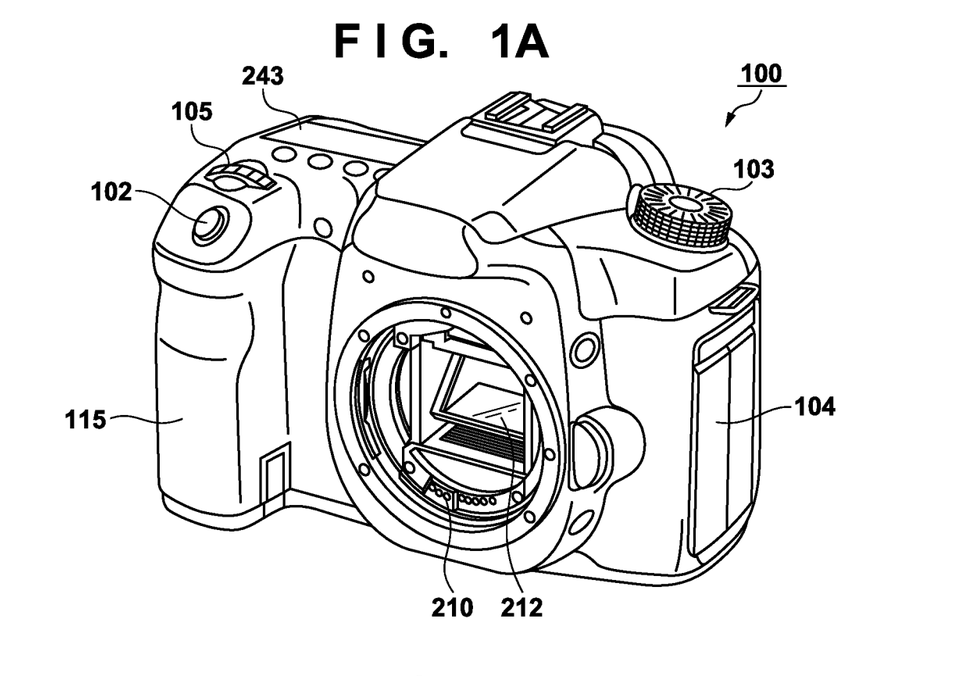
FIG. 1A is a front perspective view illustrating an apparatus configuration according to a present embodiment.
Figure 1B:
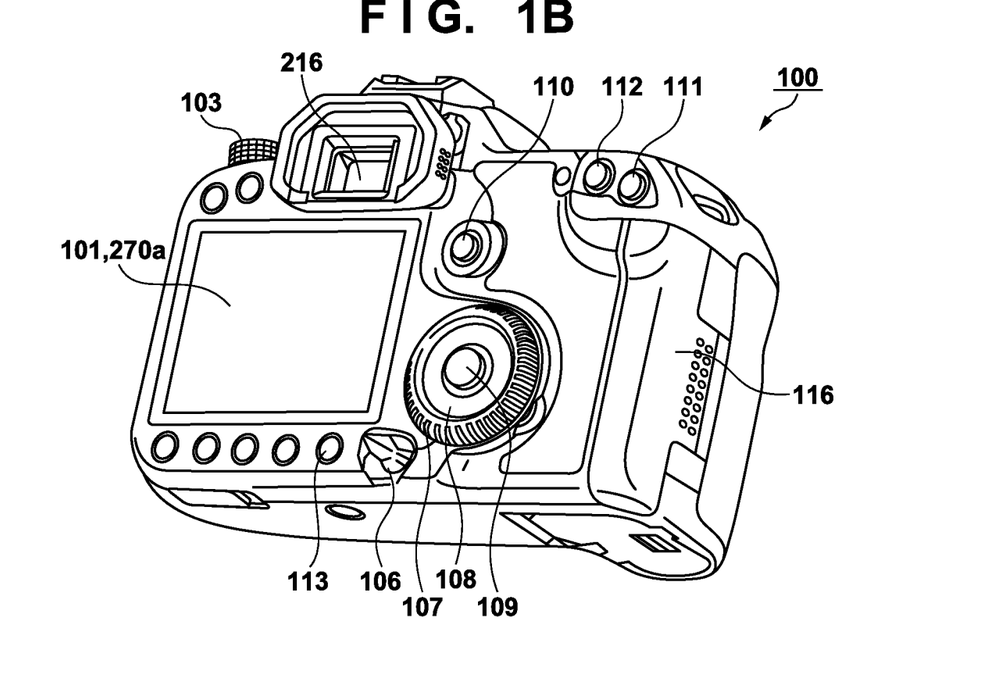
FIG. 1B is a back perspective view illustrating the apparatus configuration according to the present embodiment.

FIG. 1A is a front perspective view of the digital camera 100, and FIG. 1B is a back perspective view of the digital camera 100.

In FIGS. 1A and 1B, a backside display unit 101 is a display device for displaying images and various types of information, such as an LCD provided on the back surface of the camera body. Moreover, the backside display unit 101 has a function of reproducing a still image after the still image has been shot, a function of displaying a moving image that is being recorded, and a live view display function as well. An out-of-finder display unit 243 is a display device such as an LCD provided on the upper surface of the camera body, and displays various setting values of the camera such as a shutter speed and a diaphragm aperture.

A shutter-release button 102 is an operation unit for giving a shooting instruction. A mode selection switch 103 is a dial type operation unit for switching between various modes. A terminal cover 104 is a cover member for protecting a connector (not illustrated) for connecting an external device 300 and the digital camera 100 via a cable such as a USB cable. A main electronic dial 105 is a rotating operation member included in an operation unit 270 that will be described later with reference to FIG. 2, and by rotating this main electronic dial 105, setting values such as a shutter speed and a diaphragm aperture can be changed.

A power switch 106 is an operation member for the switching on/off of the power supply to the digital camera 100. A sub electronic dial 107 is also a rotating operation member included in the operation unit 270 that will be described later with reference to FIG. 2, and can move a selected frame, scroll images, and the like. A cross key 108 is a movement instruction member also included in the operation unit 270 that will be described later with reference to FIG. 2, and can perform, by one of four-directional buttons constituted by UP, DOWN, LEFT and RIGHT being pressed down, an operation that corresponds to the pressed portion of the cross key 108.

A SET button 109 is a push button also included in the operation unit 270 that will be described later with reference to FIG. 2, and is mainly used for determining a selection item, and the like. A live view button 110 is also a push button included in the operation unit 270 that will be described later with reference to FIG. 2, is used for the switching on/off of live view (hereinafter, it may be referred to as "LV") display in a still image shooting mode, and is used for giving an instruction to start or stop moving image shooting (recording) in a moving image recording mode. An enlargement button 111 is also a push button included in the operation unit 270 that will be described later with reference to FIG. 2, and is an operation member for the switching on/off of enlarged display during a live view and changing the magnification during the enlarged display. In addition, the enlargement button 111 is an operation member for enlarging a reproduced image and increasing the magnification in a reproduction mode. A reduction button 112 is also a push button included in the operation unit 270 that will be described later with reference to FIG. 2, and is an operation member for reducing the magnification of a reproduced image that is enlarged, and displaying a screen in a reduced state. A reproduction button 113 is also a push button included in the operation unit 270 that will be described later with reference to FIG. 2, and is an operation member for switching between a shooting mode and a reproduction mode. When the reproduction button 113 is pressed during the shooting mode, the operation mode transits to the reproduction mode, and the latest image among the images recorded on the recording medium 250 can be displayed on the backside display unit 101.

A quick return mirror 212 is driven to an upward position (an exposure position) or a downward position (a live view position) by an actuator (not illustrated) in accordance with an instruction from a system control unit 201 that will be described later with reference to FIG. 2. A communication terminal 210 includes electric contacts for the digital camera 100 to perform communication with a lens unit 200 (FIG. 2). A look-through type eyepiece finder 216 is an optical member for checking, by observing a focusing screen 213 (FIG. 2), the focus and composition of an object image taken in through the lens unit 200. A lid 116 is a member for opening or closing a slot for mounting/removing the recording medium 250 to/from the digital camera 100. A grip portion 115 has a shape that can be grasped easily by a user's a right hand when the user holds the digital camera 100 steady.

Next, the internal configuration of the digital camera 100 and the lens unit 200 according to the present embodiment will be described with reference to FIG. 2. In FIG. 2, configurations that are the same as in FIGS. 1A and 1B are denoted by the same reference signs.

Figure 2:
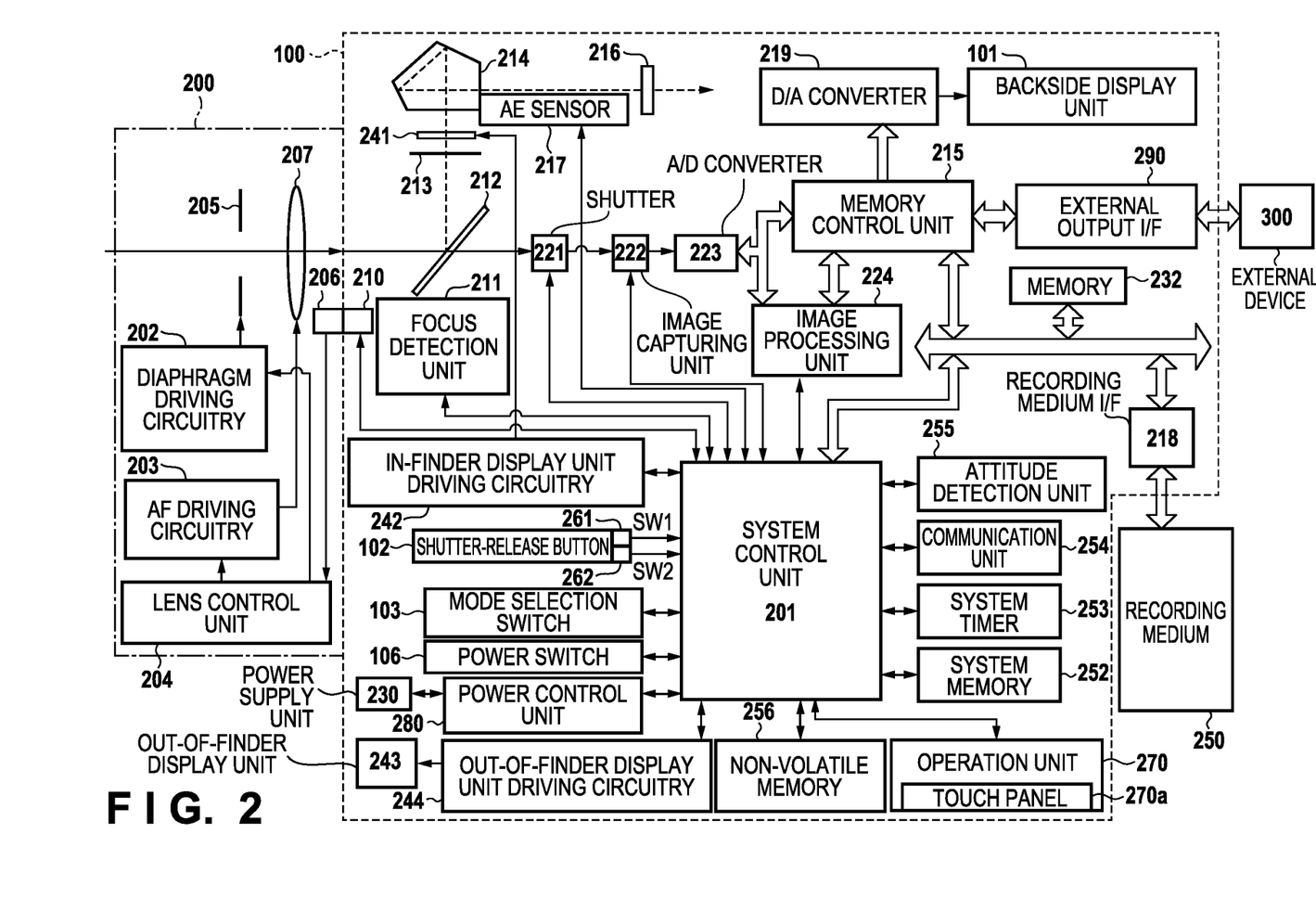
FIG. 2 is a block diagram illustrating the apparatus configuration according to the present embodiment.

In FIG. 2, the lens unit 200 is equipped with a shooting lens 207, and is detachable from the digital camera 100. The shooting lens 207 is usually constituted by a plurality of lenses, but is simplified here and is illustrated by one lens only. A communication terminal 206 includes electric contacts for the lens unit 200 to perform communication with the digital camera 100. The communication terminal 210 includes electric contacts for the digital camera 100 to perform communication with the lens unit 200. The lens unit 200 performs communication with the system control unit 201 via the communication terminal 206, and a built-in lens control unit 204 controls a diaphragm driving circuitry 202 so as to drive a diaphragm aperture 205, and controls an AF driving circuitry 203 so as to displace the position of the shooting lens 207, thereby bringing the object image in focus.

An AE sensor 217 performs photometry to obtain the luminance of the object taken in through the lens unit 200. A focus detection unit 211 outputs a defocus amount to the system control unit 201, and the system control unit 201 communicates with the lens unit 200, and performs a control for automatic focus processing using a phase difference detection method in accordance with the defocus amount.

The quick return mirror (hereinafter, "mirror") 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the eyepiece finder 216 or an image capturing unit 222. The quick return mirror 212 is usually biased toward the downward position so as to reflect the luminous flux and guide the luminous flux to the eyepiece finder 216, but for exposure and live view display, jumps upward and retracts from the luminous flux (to the upward position) so as to guide the luminous flux to the image capturing unit 222. In addition, the central portion of the quick return mirror 212 is a half mirror such that a part of the luminous flux passes through and enters the focus detection unit 211. The photographer can check, via a pentagonal prism 214 and the eyepiece finder 216, the focus and composition of the object image taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an image capturing element such as a CCD or a CMOS for converting the object image into electrical signal. An A/D converter 223 converts analog signal output from the image capturing unit 222 to digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined arithmetic processing using the captured image data, and the system control unit 201 performs exposure control and focus control based on the arithmetic results. Thus, AF (Automatic Focus) processing, AE (Automatic Exposure) processing, and EF (flash pre-emission) processing of TTL (Through the Lens) type are performed. Furthermore, the image processing unit 224 performs predetermined arithmetic processing using the captured image data, and AWB (Automatic White Balance) processing of TTL type is performed on the basis of the arithmetic results.

The digital data from the A/D converter 223 is directly written into a memory 232 via both the image processing unit 224 and the memory control unit 215 or via the memory control unit 215. The memory 232 stores image data obtained from the image capturing unit 222 and the A/D converter 223, display data for displaying on the backside display unit 101, or display or recording data for outputting to the external apparatus 300. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into analog signal and supplies the backside display unit 101 with the analog signal. The image display data that has been written into the memory 232 is displayed by the backside display unit 101 via the D/A converter 219. The backside display unit 101 performs display in accordance with the analog signal from the D/A converter 219. In this manner, the digital signals stored in the memory 232 are converted into analog signals, and the analog signals are successively transmitted to the backside display unit 101 so as to be displayed thereon, making it possible to realize an electronic view finder (EVF) functionality and to perform live view display (through-the lens image display).

A frame that indicates a focus detection point (AF position) at which AF processing is currently performed, an icon that indicates the setting state of the camera, and the like are displayed on an in-finder display unit 241 via an in-finder display unit driving circuitry 242. Accordingly, the user can check the AF position and camera setting state through an optical viewfinder (OVF) that enables an object image taken in by the lens unit 200 to be viewed by looking through the eyepiece viewfinder 216.

Various setting values of the camera such as a shutter speed and a diaphragm aperture are displayed on the out-of-finder display unit 243 via an out-of-finder display unit driving circuitry 244.

An external output I/F 290 supplies display or recording video data (still image data or moving image data) stored in the memory 232 to the external apparatus 300 in a form of digital signal as is. For example, image signal, audio signal and control signal are output according to communication protocol complying with HDMI (registered trademark) (High-Definition Multimedia Interface) standard. In this way, the display or recording video data written into the memory 232 is displayed in the external apparatus 300. The external device 300 is, for example, a 4K or 8K-compatible display or recording device. The external output I/F 290 is not limited to HDMI (registered trademark), SDI or USB is also applicable.

A non-volatile memory 256 is, for example, an EEPROM, which is electrically erasable and recordable. In the non-volatile memory 256, constants, programs, and the like for operating the system control unit 201 are stored. In this context, "programs" may refer to programs for executing various flowcharts that will be described later.

The system control unit 201 has a CPU or an MPU for overall controlling the entire digital camera 100, and realizes, by executing the programs stored in the nonvolatile memory 256, each processing of the flowcharts that will be described later. The system memory 252 is, for example, a RAM and used also as a working memory where constants and variables for operating the system control unit 201, and the programs read out from the nonvolatile memory 256 are loaded. The system control unit 201 controls the memory 232, the D/A converter 219, the backside display unit 101, the external output I/F 290, and the like, so as to perform display control. A system timer 253 is a time measurement unit for measuring time periods for various types of controls and the time of an integrated clock.

A mode selection switch 103, a first shutter switch 261, a second shutter switch 262, and the operation unit 270 are operation members for inputting various types of instructions into the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter speed-priority AE mode (Tv mode). The still image shooting mode also includes various scene mode each of which scene-specific shooting setting is made, a program AE mode, a custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes. The moving image recording mode also includes a temperature rising reduction mode (Eco mode) that reduces the temperature rising due to heat generated by the internal processing of the digital camera 100.

The temperature rising reduction function reduces less processing for capturing the image during shooting standby than the processing during shooting. In detail, when the temperature rising reduction mode is ON, the frame rate and resolution of the moving image output from the image capturing unit 222 during shooting standby are reduced to be lower than those during shooting (moving image recording). While the shutter-release button 102 provided on the digital camera 100 is being operated, that is, pressed half-way (the shooting preparation instruction), the first shutter switch 261 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data into the recording medium 250.

By selecting items for setting various functions or items representing setting values displayed on the backside display unit 101, appropriate functions for each situation are assigned to the operation unit 270, and the operation unit 270 thus acts as various function buttons. Examples of these function buttons include a menu button 270*e*, an end button, a back button, an image scrolling button, a jump button, a narrow-down button, and an attribute change button. For example, a menu screen that enables various settings to be made is displayed on the backside display unit 101 by pressing the menu button 270*e*. The user can make various settings intuitively by using the menu screen, which is displayed on the backside display unit 101, the cross key 108 and the SET button 109.

The operation unit 270 includes operation members such as various switches, buttons or touch panels that accept various operations from the user, and includes at least the following operation members. The operation members are the shutter-release button 102, the main electronic dial 105, the power switch 106, the sub electronic dial 107, the cross key 108, the SET button 109, the live view button 110, the enlargement button 111, the reduction button 112, and the reproduction button 113. The cross key 108 is a directional button in which upper, lower, right and left portions of the cross key 108 can be pushed down. Although the description is given as an integrated operation unit in the present embodiment, an up button, a down button, a right button, and a left button may be independent buttons. Hereinafter, the upper and lower portions are referred to as an up key and down key, and the left and right portions are referred to as a left and right key. In addition, the operation unit 270 includes an operation member such as a dedicated connection button for starting data communication with the external device 300 via the external output IN 290.

A power control unit 280 is constituted by, for example, a battery detection circuitry, a DC-DC converter, a switch circuitry for changing over the block to be supplied with power, and detects whether a battery has been inserted or not, the type of the battery, and the residual capacity thereof. Further, the power control unit 280 controls the DC-DC converter based on the detection results and an instruction of the system control unit 201, and supplies a necessary voltage for a necessary period of time to each of the components including the recording medium 250.

A power supply unit 230 comprises a primary battery such as an alkaline battery or a lithium battery, a secondary battery such as a NiCd battery, a NiMH battery or a Li-ion battery, or an AC adaptor and the like. A recording medium I/F 218 is an interface with the recording medium 250 such as a memory card or a hard disk drive. The recording medium 250 is a recording medium such as a memory card for recording shot images, and constituted by a semiconductor memory, a magnetic disk, or the like.

The communication unit 254 is wirelessly connected or connected by a cable, and transmits and receives image signal and audio signal. The communication unit 254 can also connect to a wireless LAN (Local Area Network) and the Internet. FTP (File Transfer Protocol) or PTP (Picture Transfer Protocol) is envisioned as the communication protocol. Since it is envisioned that a known technique is to be used, the protocol is not specifically limited in the present embodiment. The communication unit 254 can transmit images (including through-the lens images) captured by the image capturing unit 222 and image files recorded in the recording medium 250 to the external apparatus 300, and can receive image files and various types of information from the external apparatus 300.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait orientation. The system control unit 201 can add information about the orientation information corresponding to the attitude detected by the attitude detection unit 255 to the image file of an image captured by the image capturing unit 222, and rotate and record the captured image. An acceleration sensor, gyro sensor and the like may be used as an attitude detection unit 255.

In addition, the backside display unit 101 is provided with the touch panel 270*a* having a touch sensor capable of detecting a touch operation on a display screen. The touch panel 270*a* is an input device configured in a plane so as to be overlapped on the display screen of the backside display unit 101, and to output coordinate information corresponding to the touched position. The system control unit 201 can detect the following operations on the touch panel 270*a*. Touching on the touch panel 270*a* by a finger or pen (touch-down). A state in which the touch panel 270*a* is in contact with a finger or pen (touch-on). Movement of a finger or pen while in contact with the touch panel 270*a* (move). Releasing a finger or pen that has been in contact with the touch panel 270*a* (touch-up). A state in which nothing touches the touch panel 270*a* (touch-off). The continuous touch-down and touch-up of the touch panel 270*a* with a finger or a pen is referred to as a tap. These operations and position coordinates at which the touch panel 270*a* is being touched by the finger or pen are communicated to the system control unit 201 and, based upon the information thus communicated, the system control unit 201 determines what kind of operation (touch operation) has been performed on the touch panel. As for "move", the determination can be made also for every vertical component and horizontal component with regard to the direction of movement of the finger or pen, which is moved on the touch panel 270*a*, based upon a change in the coordinate position. In addition, when the touch panel 270*a* is touched up through the move of a predetermined distance or more from the touchdown, the touch panel 270*a* is dropped through dragging (dragging and dropping). The touch panel 270*a* may employ a method that relies upon any of the following: resistive film, electrostatic capacitance, surface acoustic waves, infrared radiation, electromagnetic induction, image recognition and optical sensing.

The present invention is not limited to an image capture apparatus main body, and can also be applied in a control apparatus that communicates with an image capture apparatus (including a network camera) through wired or wireless communication and remotely controls the image capture apparatus. Apparatuses such as a smartphone, which is a type of mobile phone, a tablet PC, a desktop PC, and the like can be given as examples of apparatuses that remotely control an image capture apparatus. The image capture apparatus can be remotely controlled by the control apparatus side communicating commands for carrying out various types of operations, settings to the image capture apparatus, and the like on the basis of operations made in the control apparatus side, processes carried out by the control apparatus side, and the like. Additionally, a live view image shot by the image capture apparatus may be received by the control apparatus side through wired or wireless communication and displayed.

Note that, in the present embodiment, an example has been described where the present invention is applied to a digital camera, but the present invention is not limited to this example. That is, the present invention can be applied to an apparatus that includes a display unit and can transfer data to an external device, such as a PDA (Personal Digital Assistant), a mobile phone terminal, a mobile image viewer, a printer apparatus including a display, a digital photo frame, a music player, a game machine, or an electronic book reader.

<Control Processing>

Next, control processing by the digital camera 100 according to the present embodiment will be described with reference to FIGS. 3 to 8.

Figure 3:
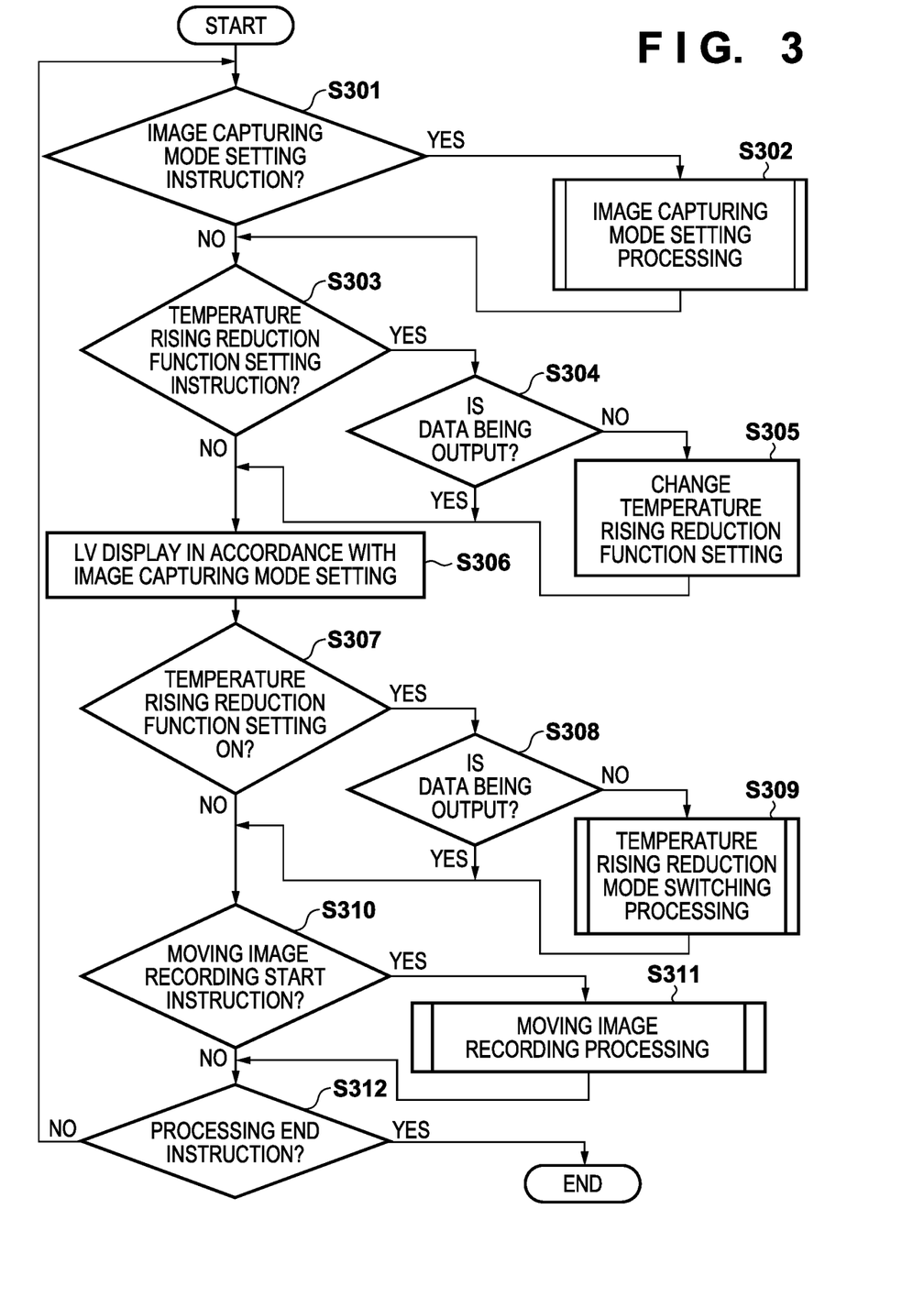
FIG. 3 is a flowchart illustrating switching processing of a temperature rising reduction function according to the present embodiment.

The processing of each flowchart of FIGS. 3 to 6 is realized by loading the program recorded in the non-volatile memory 256 in the system memory 252 and executing the program by the system control unit 201. The processing of FIG. 3 is started when the power of the digital camera 100 is turned on and the moving image recording mode is set.

First, the switching processing of the temperature rising reduction function in the moving image recording mode of the present embodiment will be described with reference to the flowchart of FIG. 3.

The temperature rising reduction function, in the moving image recording mode, suppresses the processing load of the image capturing unit 222 of the digital camera 100 and the power consumption of the battery, in order to reduce the temperature rising due to the heat generation inside the apparatus, is a function for reducing less processing for capturing the image during shooting standby than the processing during shooting. Specifically, in the case where the temperature rising reduction mode is ON, the image quality (resolution) and the frame rate, the reading method of the image signal, etc., of the moving image output from the image capturing unit 222 during shooting standby are reduced to be lower than those during shooting (during moving image recording).

In S301, the system control unit 201 determines whether or not the operation unit 270 has accepted a user operation and an image capturing mode setting instruction has been given, and proceeds to S302 when the image capturing mode setting instruction has been given, and proceeds to S303 when the image capturing mode setting instruction has not been given.

Figure 4:
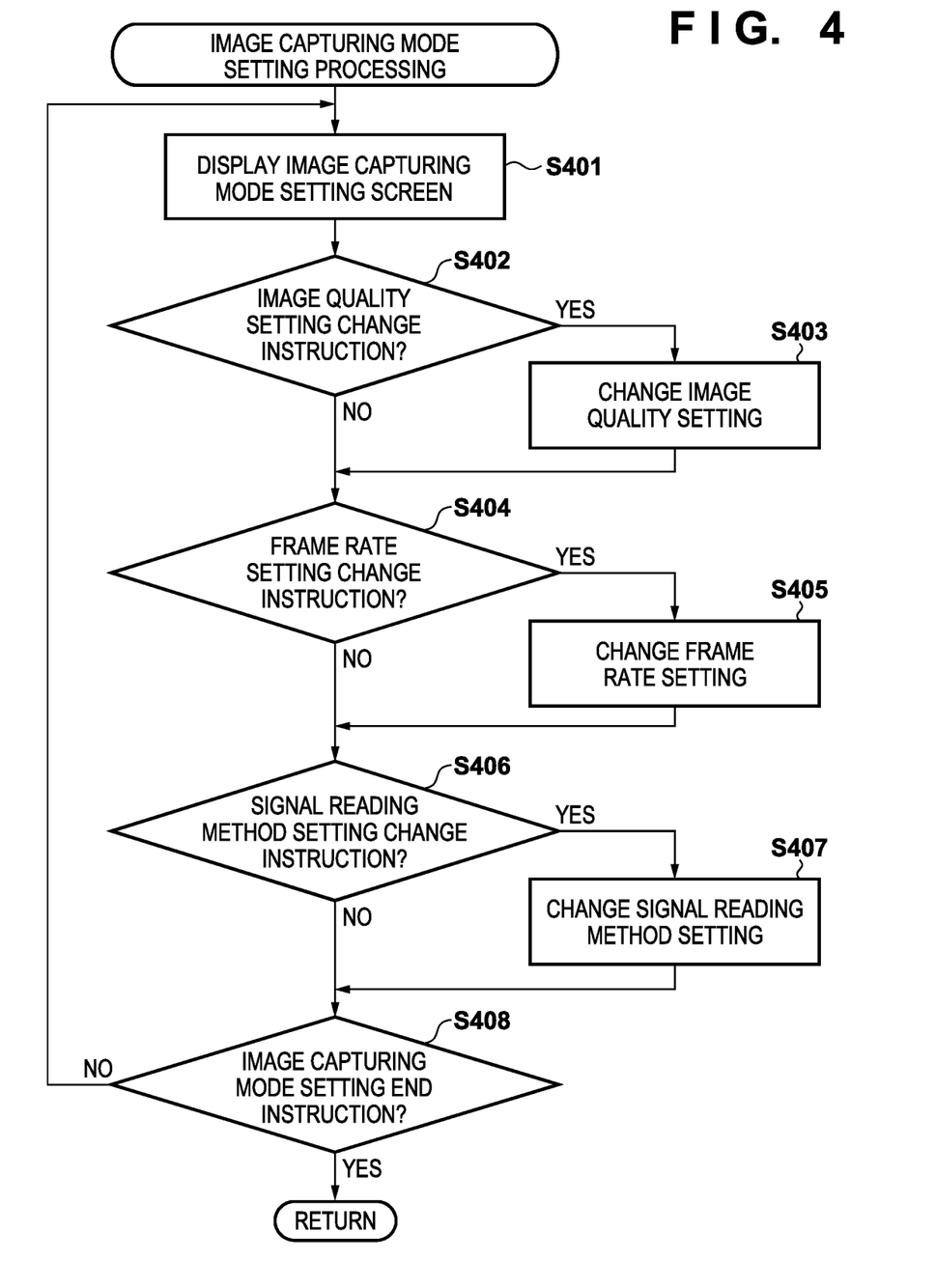
FIG. 4 is a flowchart illustrating setting processing of an image capturing mode according to the present embodiment.

In S302, the system control unit 201 performs image capturing mode setting processing that will be described later in FIG. 4.

In S303, the system control unit 201 determines whether or not the operation unit 270 has accepted a user operation and a temperature rising reduction function setting instruction has been given, and proceeds to S304 when the temperature rising reduction function setting instruction has been given, and proceeds to S306 when the temperature rising reduction function setting instruction has not been given.

In S304, the system control unit 201 determines whether or not display data or recording data is being output to the external device 300 by the external output I/F 290, and proceeds to S306 when the data is being output, and proceeds to S305 when the data is not being output.

In the present embodiment, by prohibiting changing of the temperature rising reduction setting during data outputting from the digital camera 100 to the external device 300, it is possible to preventing disadvantage during external outputting for displaying or recording moving image in the external device 300. Note that the changing of the temperature rising reduction setting during external outputting will be prohibited even when one screen setting in which the image is displayed only on the display device of the output destination or even when two screen setting in which the image is displayed on both the display device of the output destination and the backside display unit 101 of the digital camera 100.

In S305, the system control unit 201 changes the temperature rising reduction function setting to be ON or OFF in accordance with the user operation accepted by the operation unit 270, and stores the changed setting in the system memory 252.

In S306, the system control unit 201 changes the operation setting of the image capturing unit 222 in accordance with the image capturing mode setting set in S302 and displays the live view image on the backside display unit 101.

In S307, the system control unit 201 determines the setting state of the temperature rising reduction function, and proceeds to S308 when the temperature rising reduction function is ON, and proceeds to S310 when the temperature rising reduction function is OFF.

In S308, the system control unit 201 determines whether or not display data or recording data is being output to the external device 300 by the external output I/F 290, and proceeds to S310 when the data is being output, and proceeds to S309 when the data is not being output.

In the present embodiment, by prohibiting switching to the temperature rising reduction mode during external outputting, it is possible to prevent disadvantage during external outputting for displaying or recording moving image in the external device 300. Note that the switching to the temperature rising reduction mode during external outputting will be prohibited even when one screen setting in which the image is displayed only on the display device of the output destination or even when two screen setting in which the image is displayed on both the display device of the output destination and the backside display unit 101 of the digital camera 100.

Figure 5:
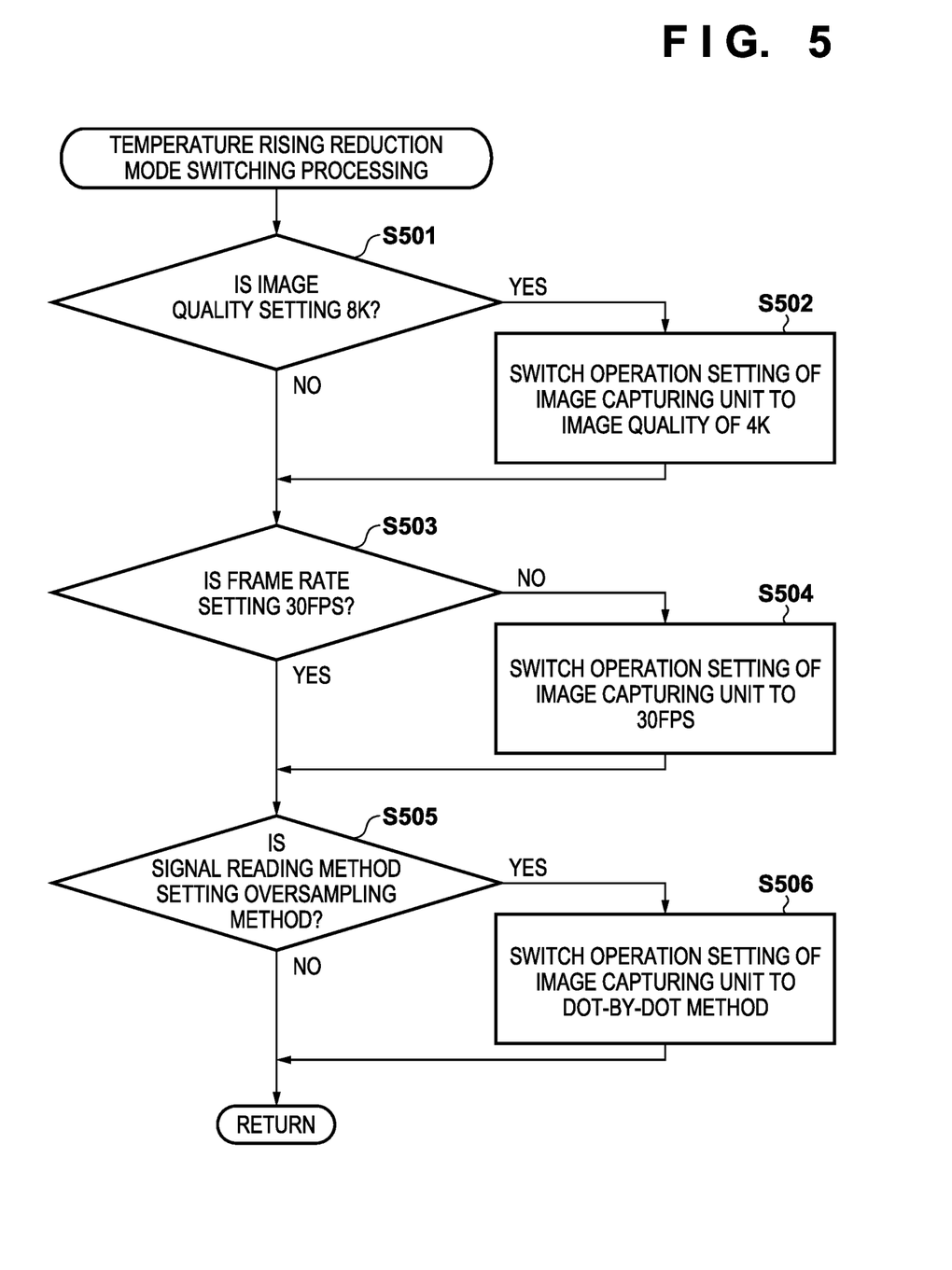
FIG. 5 is a flowchart illustrating switching processing of a temperature rising reduction mode according to the present embodiment.

In S309, the system control unit 201 performs temperature rising reduction mode switching processing that will be described later in FIG. 5.

In S310, the system control unit 201 determines whether or not the operation unit 270 has accepted a user operation and a moving image recording start instruction has been given, such as by the live view button 110 being pressed, and proceeds to S311 when the moving image recording start instruction has been given, and proceeds to S312 when the moving image recording start instruction has not been given.

Figure 6:
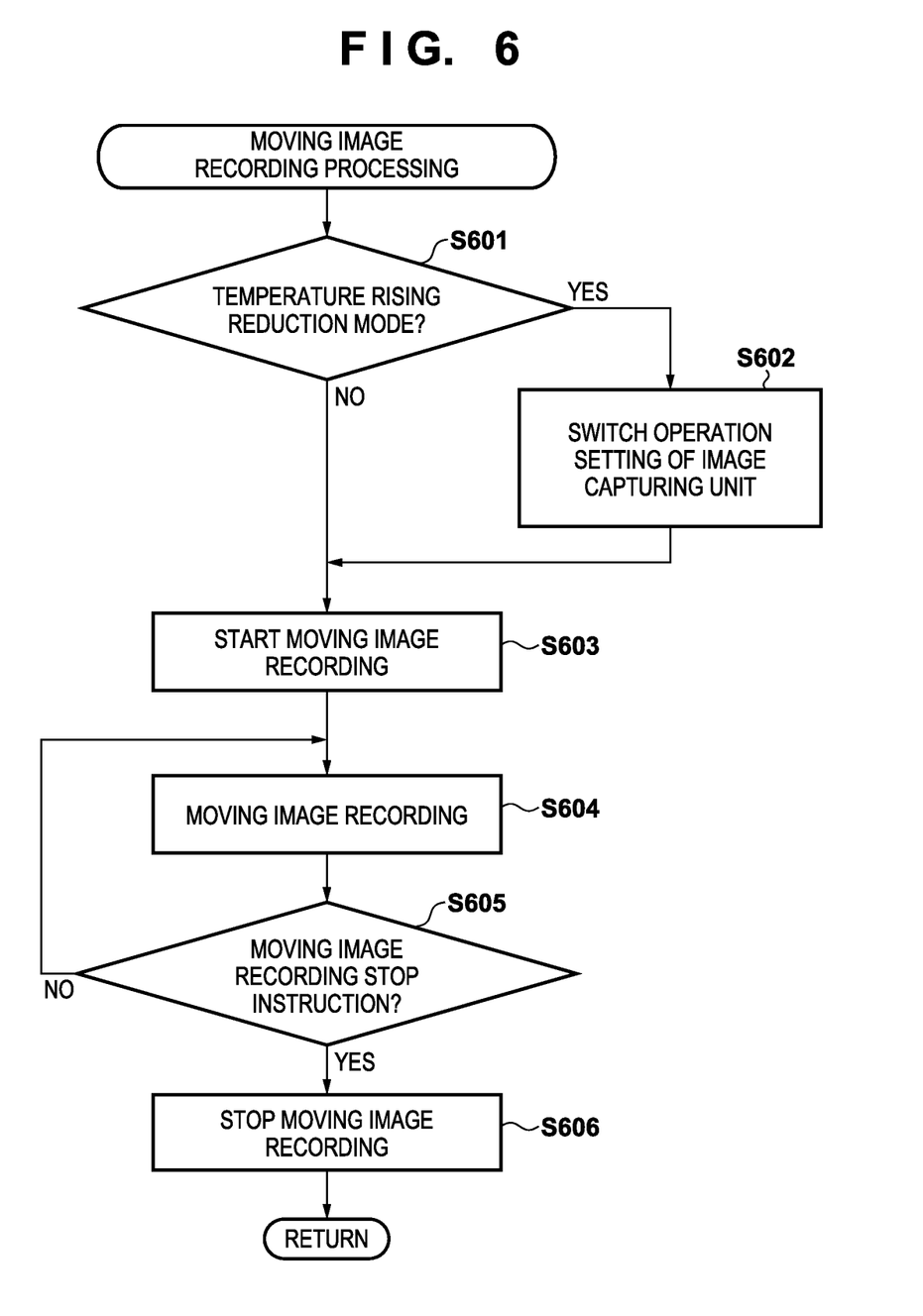
FIG. 6 is a flowchart illustrating moving image recording processing according to the present embodiment.

In S311, the system control unit 201 performs moving image recording processing that will be described later with reference to FIG. 6.

In S312, the system control unit 201 determines whether or not the operation unit 270 has accepted a user operation and a processing end instruction has been given, such as by the power switch 106 being turned OFF, and ends the processing when the processing end instruction has been given, and returns to S301 and repeats the processing when the processing end instruction has not been given.

<Image Capturing Mode Setting Processing>

Next, image capturing mode setting processing in S302 of FIG. 3 will be described with reference to FIG. 4.

Figure 7:
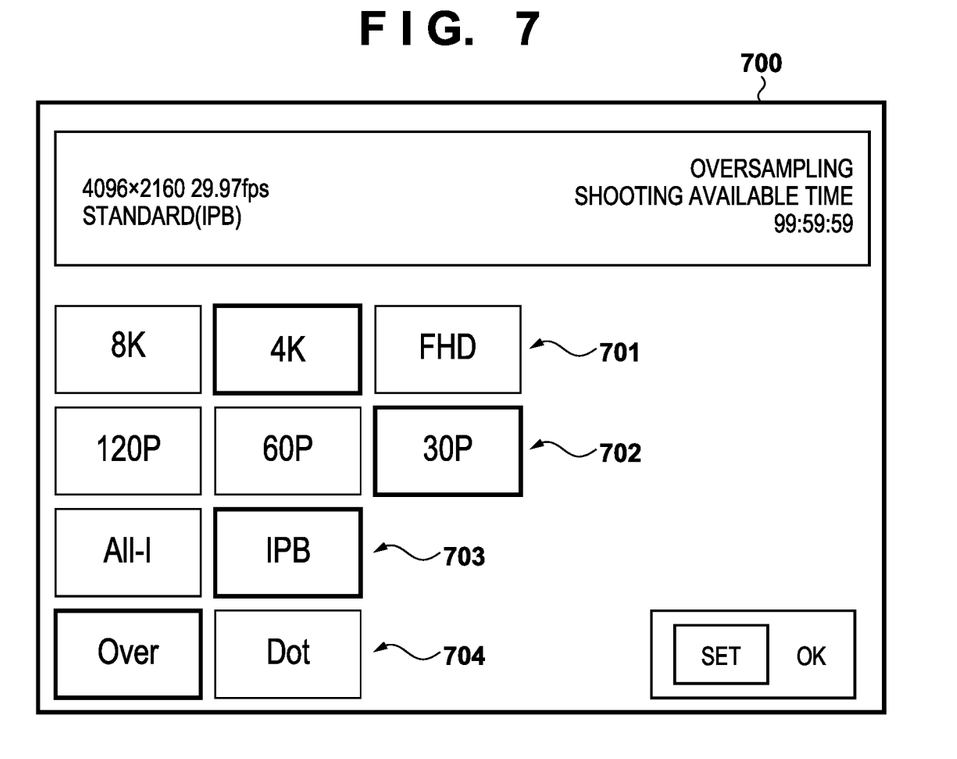
FIG. 7 is an example illustrating an image capturing mode setting screen according to the present embodiment.

In S401, the system control unit 201 displays an image capturing mode setting screen 700 illustrated in FIG. 7 on the backside display unit 101. The user can select an arbitrary setting for each items of image quality setting items 701, frame rate setting items 702, image compression method setting items 703, and signal reading method setting items 704 displayed on the image capturing mode setting screen of FIG. 7 by operating the operation unit 270 or by touching the touch panel 270a of the backside display unit 101. The image quality setting items 701 includes image resolution options such as 4K, 8K, and FHD. The frame rate setting items 702 include options such as 120 FPS (frames per second), 60 FPS, 30 FPS, and the like. The image compression method setting items 703 includes options of All-I and IPB for each image quality setting items 701. The signal reading method setting items 704 include options such as an oversampling method (Over) and a dot-by-dot method (Dot), and the like. The oversampling method is a method for converting the image into the set image quality after reading all pixels have been read from the image capturing element, and the dot-by-dot method is a method for reading pixels of only the area of the set image quality from the image capturing element.

In S402, the system control unit 201 determines whether or not the operation unit 270 has accepted a user operation and an image quality setting change instruction has been given, and proceeds to S403 when the image quality setting change instruction has been given, and proceeds to S404 when the image quality setting change instruction has not been given. The user can select an arbitrary setting from the image quality setting items 701 in the image capturing mode setting screen 700 in FIG. 7.

In S403, the system control unit 201 changes the image quality setting in accordance with the image quality setting change instruction accepted in S402, and stores the image quality setting in the system memory 252.

In S404, the system control unit 201 determines whether or not the operation unit 270 has accepted a user operation and a frame rate setting change instruction has been given, and proceeds to S405 when the frame rate setting change instruction has been given, and proceeds to S406 when the frame rate setting change instruction has not been given.

In S405, the system control unit 201 changes the frame rate setting in accordance with the frame rate change instruction accepted in S404, and stores the frame rate setting in the system memory 252.

In S406, the system control unit 201 determines whether or not the operation unit 270 has accepted a user operation and a signal reading method setting change instruction has been given, and proceeds to S407 when the signal reading method setting change instruction has been given, and proceeds to S408 when the signal reading method setting change instruction has not been given.

In S407, the system control unit 201 changes the signal reading method setting in accordance with the signal reading method setting change instruction accepted in S406, and stores the signal reading method setting in the system memory 252.

In S408, the system control unit 201 determines whether or not the operation unit 270 has accepted a user operation and an image capturing mode setting end instruction has been given, and ends the processing when the image capturing mode setting end instruction has been given, and returns to S401 and repeats the processing when the image capturing mode setting end instruction has not been given.

<Temperature Rising Reduction Mode Switching Processing>

Next, temperature rising reduction mode switching processing in S309 of FIG. 3 will be described with reference to FIG. 5.

In S501, the system control unit 201 determines whether or not the image quality setting stored in the system memory 252 is 8K, and proceeds to S502 when the image quality setting is 8K, and proceeds to S503 when the image quality setting is not 8K.

In S502, the system control unit 201 switches the operation setting of the image capturing unit 222 to the setting of 4K.

In S503, the system control unit 201 determines whether or not the frame rate setting stored in the system memory 252 is 30P, and proceeds to S505 when the setting is 30P, and proceeds to S504 when the setting is not 30P.

In S504, the system control unit 201 switches the operation setting of the image capturing unit 222 to the setting of 30P.

In S505, the system control unit 201 determines whether or not the signal reading method setting stored in the system memory 252 is the oversampling method, and proceeds to S506 when the setting is the oversampling method, and ends the processing when the setting is not the oversampling method.

In S506, the system control unit 201 switches the operation setting of the image capturing unit 222 to the setting of the dot-by-dot method.

Figure 8:
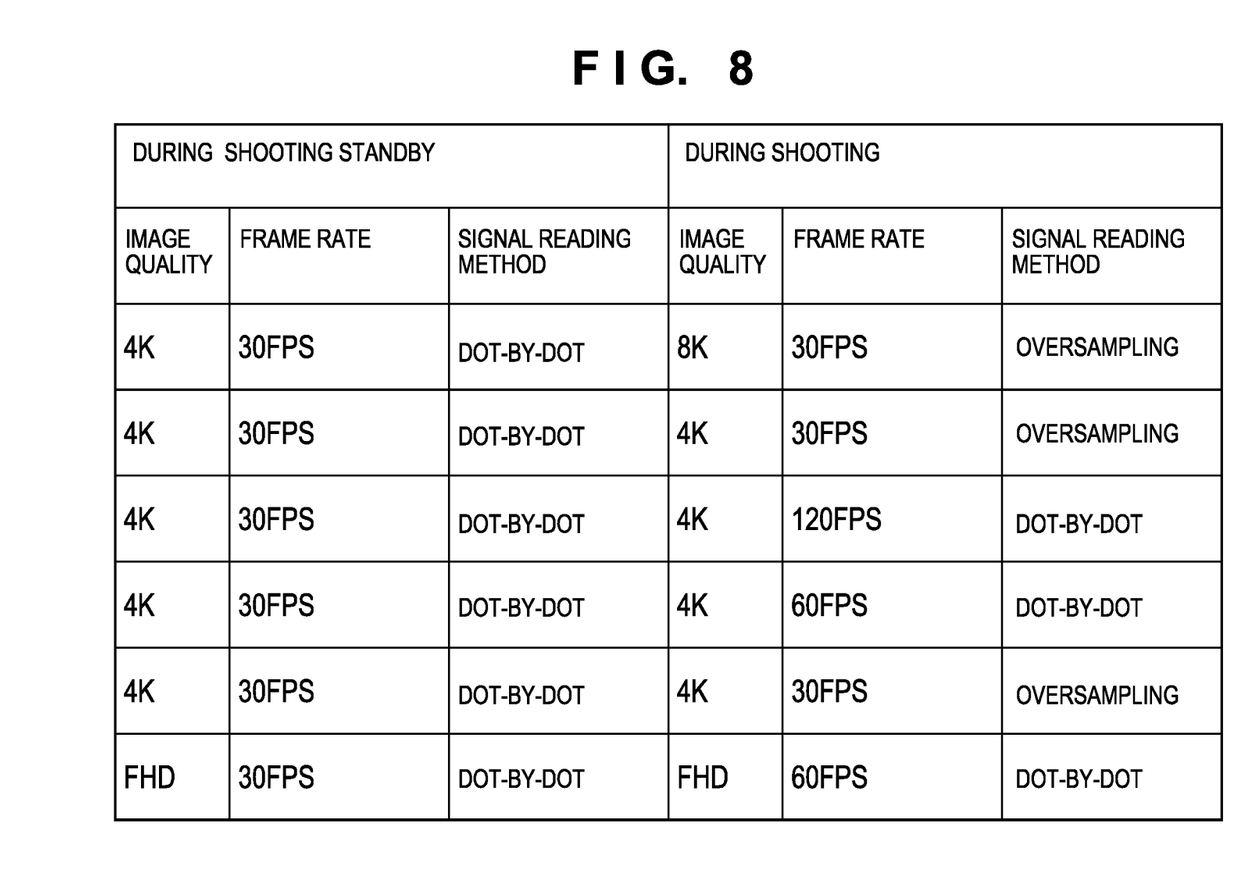
FIG. 8 is an example illustrating an image capturing mode that switches between shooting standby and shooting in the temperature rising reduction mode according to the present embodiment.

FIG. 8 is an example illustrating part of the image capturing mode settings that will be switched between shooting standby and shooting in the temperature rising reduction mode. In FIG. 8, when the temperature rising reduction function is set to be ON, during shooting standby, at least one setting of the image quality setting, the frame rate setting, and the signal reading method setting is changed in a direction to be lower. As a result, it is possible to reduce the internal temperature of the digital camera 100 that will become higher.

<Moving Image Recording Processing>

Next, the moving image recording processing in S311 of FIG. 3 will be described with reference to FIG. 6.

In S601, the system control unit 201 determines whether or not the operation mode has been switched to the temperature rising reduction mode, and proceeds to S602 when the operation mode has been switched to the temperature rising reduction mode, and proceeds to S603 when the operation mode has not been switched to the temperature rising reduction mode.

In S602, the system control unit 201 switches the operation setting of the image capturing unit 222 in accordance with the image capturing mode setting stored in the system memory 252.

In S603, the system control unit 201 performs moving image recording start processing such as a start of reading signal from the image capturing unit 222.

In S604, the system control unit 201 generates a moving image file from signal read from the image capturing unit 222, and performs moving image recording processing of writing the moving image file into the recording medium 250.

In S605, the system control unit 201 determines whether or not the operation unit 270 has accepted a user operation and a moving image recording stop instruction has been given, such as by the live view button 110 being pressed, and proceeds to S606 when the moving image recording stop instruction has been given, and proceeds to S604 when the moving image recording stop instruction has not been given.

In S606, the system control unit 201 performs moving image recording stop processing such as a stop of reading signal from the image capturing unit 222.

When an abnormal operation such as rotation of a mode dial or the like is performed in the processing of FIGS. 3 to 6, the processing may be interrupted halfway through the processing.

As described above, according to the present embodiment, when the digital camera 100 can be operated by switching to the temperature rising reduction mode, when it is not during external outputting, the setting of the temperature rising reduction function and the switching to the temperature rising reduction mode are permitted to reduce the internal temperature of the digital camera 100 that will become higher. In addition, when it is during external outputting, the setting of the temperature rising reduction function and the switching to the temperature rising reduction mode are prohibited so as to suppress deterioration of the quality of the image to be externally output, and reduce disadvantage for recording the image in the recording device and for displaying the image in the display device.

According to the present invention, it is possible to reduce a temperature rising inside the apparatus and suppress the deterioration of the quality of the image to be output to the external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capture apparatus comprising:
a display unit configured to display an image obtained by an image capturing unit;
an output unit configured to output the image to an external device;
a processing unit capable of switching and executing a plurality of operations that include a first operation of capturing the image with an first image capturing mode setting during shooting and capturing the image with a second image capturing mode setting during shooting standby, processing for capturing the image with the second image capturing mode setting during shooting standby being reduced to be lower than processing for capturing the image with the first image capturing mode setting during shooting, and a second operation of capturing the image with the first image capturing mode setting regardless of whether the image capturing during shooting standby or the image capturing during shooting; and
a control unit configured to, when an output of the image to the external device is not being performed by the output unit, permitting the processing unit to perform the first operation, and
when an output of the image to the external device is being performed by the output unit, prohibiting the processing unit to perform the first operation.

2. The apparatus according to claim 1, further comprising
a first operation unit configured to accept a first user operation to set the first operation to be performed; and
a second operation unit configured to accept a second user operation to set the first image capturing mode setting,
wherein when the output of the image to the external device is not being performed by the output unit, the control unit permits setting to perform the first operation by the first user operation and changing the first image capturing mode setting set by the second user operation to the second image capturing mode setting,
when the output of the image to the external device is being performed by the output unit, the control unit prohibits setting to perform the first operation by the first user operation and changing the first image capturing mode setting set by the second user operation to the second image capturing mode setting.

3. The apparatus according to claim 1, wherein the first image capturing mode setting and the second image capturing mode setting include at least one of a quality of the image, a frame rate of the image, and a reading method of the image.

4. The apparatus according to claim 1, wherein the second image capturing mode setting is an image capturing mode setting such that a heat generation due to processing for capturing the image with the second image capturing mode setting is reduced to be lower than a heat generation due to processing with the first image capturing mode setting.

5. The apparatus according to claim 1, wherein when an output of the image to the external device is being performed by the output unit, the control unit prohibits the processing unit to execute the first operation even when a screen setting for displaying the image only on the external device of the output destination of the image, and even when the screen setting for displaying the image on both the external device and the image capture apparatus of the output destination of the image.

6. The apparatus according to claim 1, wherein the display unit displays the image generated by the image capturing unit as a live view.

7. The apparatus according to claim 1, further comprising recording unit configured to recording the image generated by the image capturing unit.

8. The apparatus according to claim 1, wherein the processing unit includes the image capturing unit.

9. A method of controlling an image capture apparatus which has a display unit configured to display an image obtained by an image capturing unit and an output unit configured to output the image to an external device, and is capable of switching and executing a plurality of operations that include a first operation of capturing the image with a first image capturing mode setting during shooting and capturing the image with a second image capturing mode setting during shooting standby, processing for capturing the image with the second image capturing mode setting during shooting standby being reduced to be lower than processing for capturing the image with the first image capturing mode setting during shooting, and a second operation of capturing the image with the first image capturing mode setting regardless of whether the image capturing during shooting standby or the image capturing during shooting, the method characterized by comprising:

when an output of the image to the external device is not being performed by the output unit, permitting the image capture apparatus to execute the first operation; and when an output of the image to the external device is being performed by the output unit, prohibiting the image capture apparatus to execute the first operation.

10. A non-transitory computer-readable storage medium storing a program for causing a computer to function as an image capture apparatus comprising:

a display unit configured to display an image obtained by an image capturing unit;

an output unit configured to output the image to an external device;

a processing unit capable of switching and executing a plurality of operations that include a first operation of capturing the image with a first image capturing mode setting during shooting and capturing the image with a second image capturing mode setting during shooting standby, processing for capturing the image with the second image capturing mode setting during shooting standby being reduced to be lower than processing for capturing the image with the first image capturing mode setting during shooting, and a second operation of capturing the image with the first same image capturing mode setting regardless of whether the image capturing during shooting standby or the image capturing during shooting; and a control unit configured to, when an output of the image to the external device is not being performed by the output unit, permitting the processing unit to perform the first operation, and when an output of the image to the external device is being performed by the output unit, prohibiting the processing unit to perform the first operation.

* * * * *